US012667095B2

(12) United States Patent
Crowley

(10) Patent No.: US 12,667,095 B2
(45) Date of Patent: Jun. 30, 2026

(54) ROTATING NOZZLE FOR AGRICULTURAL CROP SPRAYER

(71) Applicant: AGCO Corporation, Duluth, GA (US)

(72) Inventor: Mark Aron Crowley, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 441 days.

(21) Appl. No.: 18/004,920

(22) PCT Filed: Jun. 24, 2021

(86) PCT No.: PCT/IB2021/055622
§ 371 (c)(1),
(2) Date: Jan. 10, 2023

(87) PCT Pub. No.: WO2022/018543
PCT Pub. Date: Jan. 27, 2022

(65) Prior Publication Data
US 2023/0354798 A1 Nov. 9, 2023

Related U.S. Application Data

(60) Provisional application No. 63/056,023, filed on Jul. 24, 2020.

(51) Int. Cl.
*A01M 7/00* (2006.01)
*B05B 3/06* (2006.01)

(52) U.S. Cl.
CPC ............. *A01M 7/005* (2013.01); *B05B 3/063* (2013.01)

(58) Field of Classification Search
CPC ................................ A01M 7/005; B05B 3/063

USPC .......................................... 239/251, 237, 240
See application file for complete search history.

(56) References Cited

U.S. PATENT DOCUMENTS

| | | | |
|---|---|---|---|
| 6,092,739 A | 7/2000 | Clearman et al. | |
| 6,193,169 B1 * | 2/2001 | Steinhilber | ............. B05B 3/003 |
| | | | 239/240 |
| 7,963,462 B1 * | 6/2011 | Ramos, Sr. | ............. B05B 3/063 |
| | | | 239/233 |
| 7,967,552 B2 | 6/2011 | Brett | |
| 8,807,453 B2 * | 8/2014 | Hsieh | ................... B05B 3/1035 |
| | | | 239/226 |

(Continued)

FOREIGN PATENT DOCUMENTS

| | | |
|---|---|---|
| DE | 3243230 C2 | 11/1986 |
| EP | 0445100 A1 | 9/1991 |

(Continued)

OTHER PUBLICATIONS

UK Intellectual Property Office, Search report for related UK Application No. GB2012886.4, dated Jan. 25, 2021, 5 pages.

(Continued)

*Primary Examiner* — Christopher S Kim

(57) ABSTRACT

A nozzle assembly for use with an agricultural crop sprayer includes a nozzle body and a turbine element journaled to the body. The turbine element has a fluid-conveying internal passage having a rifled profile. Other nozzle assemblies have a nozzle tip journaled to a nozzle body, and the nozzle tip has a fluid-carrying passage with a surface profile configured to interact with fluid passing therethrough to apply a torque on the nozzle tip.

14 Claims, 10 Drawing Sheets

(56) References Cited

U.S. PATENT DOCUMENTS

| 2006/0065760 A1* | 3/2006 | Micheli | ................ B05B 3/1064 |
| | | | 239/340 |
| 2013/0037625 A1 | 2/2013 | Arenson et al. | |
| 2014/0048611 A1 | 2/2014 | Palmquist | |

FOREIGN PATENT DOCUMENTS

| FR | 2475447 A1 | 8/1981 |
| FR | 2815552 A1 | 4/2002 |
| JP | 2008511432 A | 4/2008 |

OTHER PUBLICATIONS

European Patent Office, International Search Report related to International Patent Application No. PCT/IB2021/055622, mail date Oct. 11, 2022, 8 pages.

* cited by examiner

ROTATING NOZZLE FOR AGRICULTURAL CROP SPRAYER

CROSS-REFERENCE TO RELATED APPLICATION

This application is a national phase entry under 35 U.S.C. § 371 of International Patent Application PCT/IB2021/055622, filed Jun. 24, 2021, designating the United States of America and published in English as International Patent Publication WO 2022/018543 A1 on Jan. 27, 2022, which claims the benefit of the filing date of U.S. Provisional Patent Application 63/056,023 "Rotating Nozzle for Agricultural Crop Sprayer," filed Jul. 24, 2020, the entire disclosure of which is incorporated herein by reference.

FIELD

Aspects of the present disclosure relate to agricultural crop sprayers and particularly to nozzle assemblies for use with agricultural crop sprayers.

BACKGROUND

Agricultural crop sprayers are used by farmers and contractors to apply pesticides, plant growth regulators, and other nutrient-containing solutions to crop fields. Sprayers can be mounted to, or towed by, a tractor or other suitable vehicle or may be self-propelled, having an integrated means of propulsion and a driver's cab. The sprayer machine typically includes a storage tank for the liquid to be applied, the tank being filled as required by the operator. Alternatively, in systems which offer lower ground pressure, the sprayer machine may be semi-permanently connected by a pipe to a local (field-based) bowser, and the applied liquid may be supplied via a pipe from the bowser to the sprayer continuously as the sprayer moves across the crop field.

The liquid is applied to the field by a number of discharge devices mounted along the length of a boom mounted to the sprayer vehicle. The discharge devices are each connected to the storage tank by a fluid delivery network comprising various pipes, valves, pumps, and other plumbing. Although the liquid may be discharged under the crop canopy through drop hoses, most product applications are sprayed from above using nozzles. The liquid is typically atomized by the nozzle and applied to the crop in a jet of mist, for example. The nozzles typically operate at a fluid pressure of up to 4 bar, although lower pressures of around 2 bar may be used to avoid drift.

For crop spraying operations, the application rate of the liquid is often critical, and uniform and well-defined coverage is desirable. Overdosing of the chemical solution can result in exceeding the legal maximum chemical dose, damage to the crop, and/or waste of expensive product. Under-dosing can result in ineffective chemical operation or detrimental impact on the crop.

Before or during operation, nozzles can become partially or completely blocked due to build-up of residues in the nozzle cavities and flow paths, caused by solidified chemical product or dirt in the liquid flow. Nozzle blockage results in under-dosing. Often nozzle blockage only becomes apparent when streaking appears in the crop days or weeks later.

The use of in-line filters and thorough rinsing of the plumbing after use reduces the occurrence of nozzle blockage. However, in view of the potential impact caused to the crop, complex and expensive nozzle blockage monitoring systems are often employed to warn the operator in the event of a blocked nozzle. Despite the technology available to detect blocked nozzles, the avoidance of blocked nozzles in the first instance is a better approach.

BRIEF SUMMARY

In some embodiments, a nozzle assembly for use with an agricultural crop sprayer includes a turbine element journaled to a body and having a fluid-conveying internal passage with a rifled profile. A torque is created from the interaction of fluid flowing through the tube and the rifling of the internal profile, which causes the turbine element to rotate with respect to the body during a spraying operation. The rotational movement may reduce the risk of residues and particulate material building up inside the passage.

In one embodiment, the turbine element has a cylindrical portion defining a rotation axis along which the passage is aligned. The passage may be substantially straight and coaxial with the rotation axis so as to present an unrestricted flow path to the fluid.

The body may define a circular aperture in which the turbine element is journaled. A bearing may be secured inside the body, and may have a circular aperture that receives the turbine element and facilitates supported rotation thereof. In one embodiment, the body has a first annular shelf against which the bearing abuts to prevent longitudinal movement of the bearing. An annular seal may be retained within the body to retain the bearing in the body.

The turbine element may include a shoulder portion having a greater diameter than the aperture so as to prevent the turbine element from passing completely through the aperture. One or more radially offset channels may extend through the shoulder portion outward from the passage to create inlets to drain any sediment that builds up when not in operation.

The nozzle assembly may have a retaining clip, which is received in a circumferential groove in the turbine element. The clip holds the turbine element in position and prevents axial (i.e., longitudinal) displacement with respect to the aperture.

In one embodiment, the turbine element is a nozzle tip having a nozzle opening formed in an end face thereof. In this embodiment, the nozzle tip itself rotates as it dispenses liquid, the rotation serving to "throw" or eject dirt and other residues away from the assembly. In an agricultural sprayer, the nozzle tip typically presents the narrowest aperture for the liquid to pass and, therefore, is the component most prone to build-up of residues and blockage. Furthermore, the nozzle tip is the final, or most downstream, hardware component in the spray apparatus. By rotating the nozzle tip during operation, solid material may be easily ejected, reducing the risk of blockage and consequential downtime. By rotating the nozzle tip, a more even spray may also be created.

The passage may be rifled up to the end face. In this way, the end face is configured to discharge off-center jets. Moreover, solid material caught up in the flow of liquid experiences the centrifugal forces right up to the end face and is thrown radially outwardly.

In another embodiment, the end face has a surface profile that defines a plurality of radially directed channels.

In yet another embodiment, the turbine element is adapted for attachment of a nozzle tip which, when attached, is in fluid communication with the passage. As such, the turbine element carries the nozzle tip and generates the rotational movement with respect to the body. Nozzle tips with standard fittings may be simply attached and detached from the turbine element to cater for the specific spraying task in hand. The turbine element may include lugs, (e.g., dove-tailed) on a circumferential face for keying with the nozzle tip.

In accordance with another embodiment, a nozzle assembly for use with an agricultural crop sprayer includes a nozzle tip having a nozzle opening formed in an end face of the nozzle tip and being journaled to a body. The nozzle tip has a fluid-conveying passage having a surface profile that is configured to interact with fluid passing through the passage to create a torque upon the nozzle tip.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

While the disclosure will be described in connection with these drawings, there is no intent to limit to the embodiment or embodiments disclosed herein. Although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Figure 1:
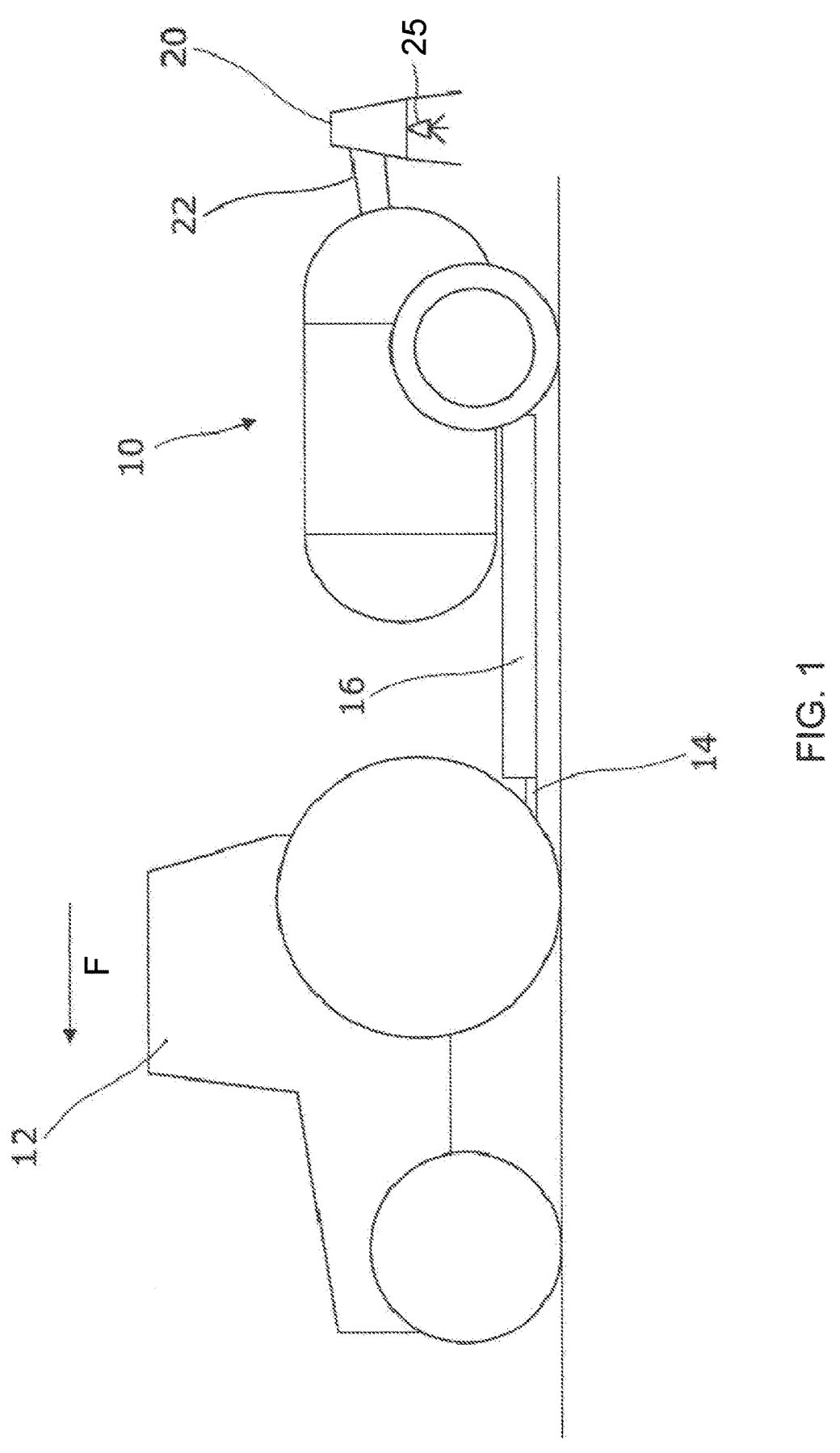
FIG. 1 is a simplified side elevation of an agricultural tractor pulling a trailed agricultural crop sprayer.

FIG. 1 shows a trailed agricultural sprayer 10 in schematic form. The sprayer 10 is attached to the rear of a tractor 12 by a towing hitch 14 associated with the tractor 12 and a drawbar tongue forming part of the chassis 16 of the sprayer 10. The sprayer 10 includes a storage tank 18, which can store liquid material to be applied to a crop field. A spray boom 20 extends transversely with respect to a general forward direction (arrow F) and may be suspended from the chassis 16 by a boom suspension assembly 22. The tractor 12 and sprayer 10 are driven in a generally forward direction (arrow F) through crop fields to apply pesticides or nutrient-containing solutions to a growing plant or directly on to the ground. A plurality of nozzle assemblies 25 are mounted to the spray boom 20, each nozzle assembly 25 being plumbed to a liquid distribution system that delivers liquid from the storage tank 18 to the nozzle assemblies 25 during operation.

Although a tractor and trailed sprayer combination is illustrated in FIG. 1, other types of agricultural crop sprayers, including mounted sprayers and self-propelled sprayers, may also have such nozzle assemblies 25.

Figure 5:
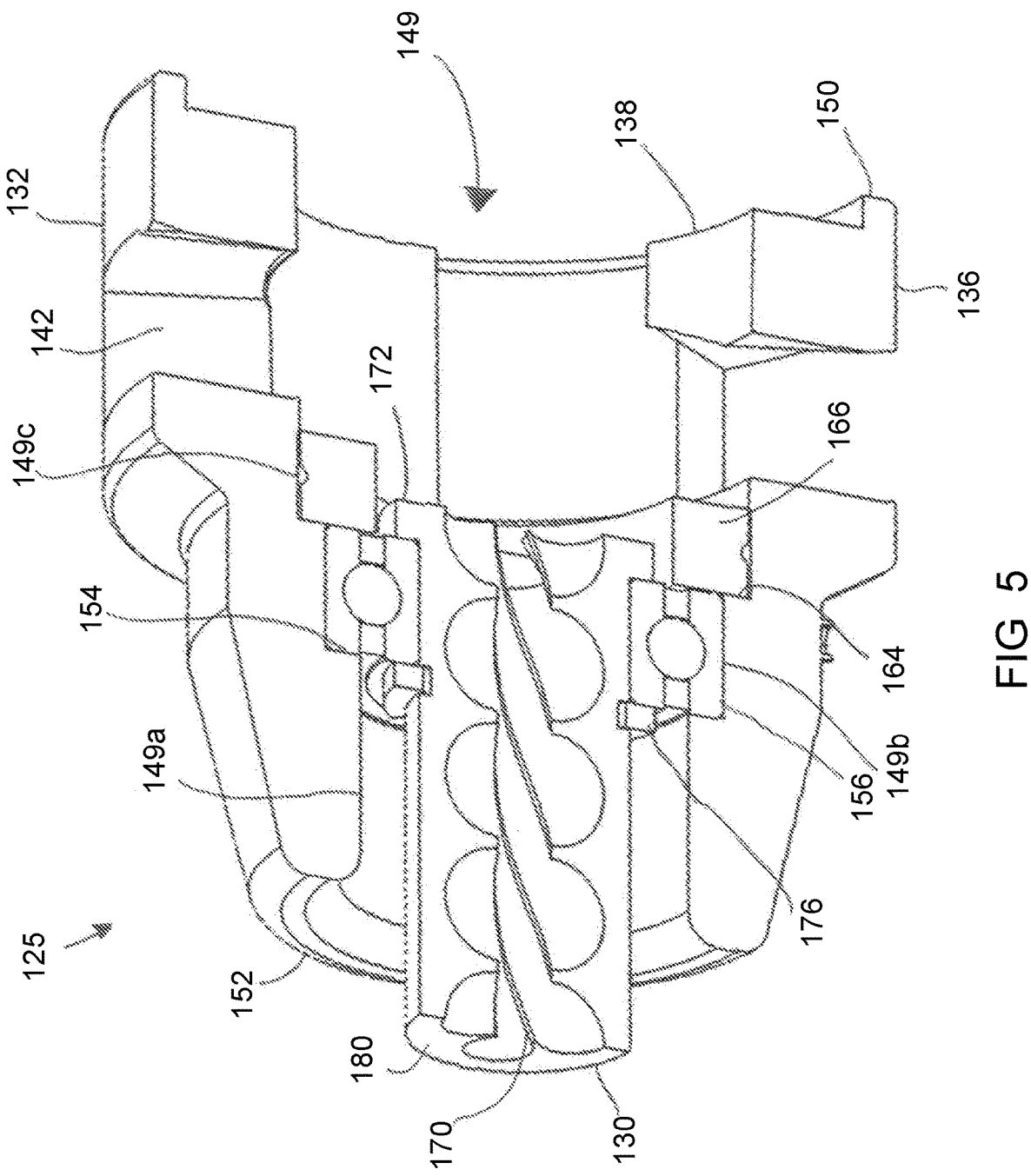
FIG. 5 is a sectional view of the nozzle assembly of FIG. 2 viewed along the line V-V.
Figure 6:
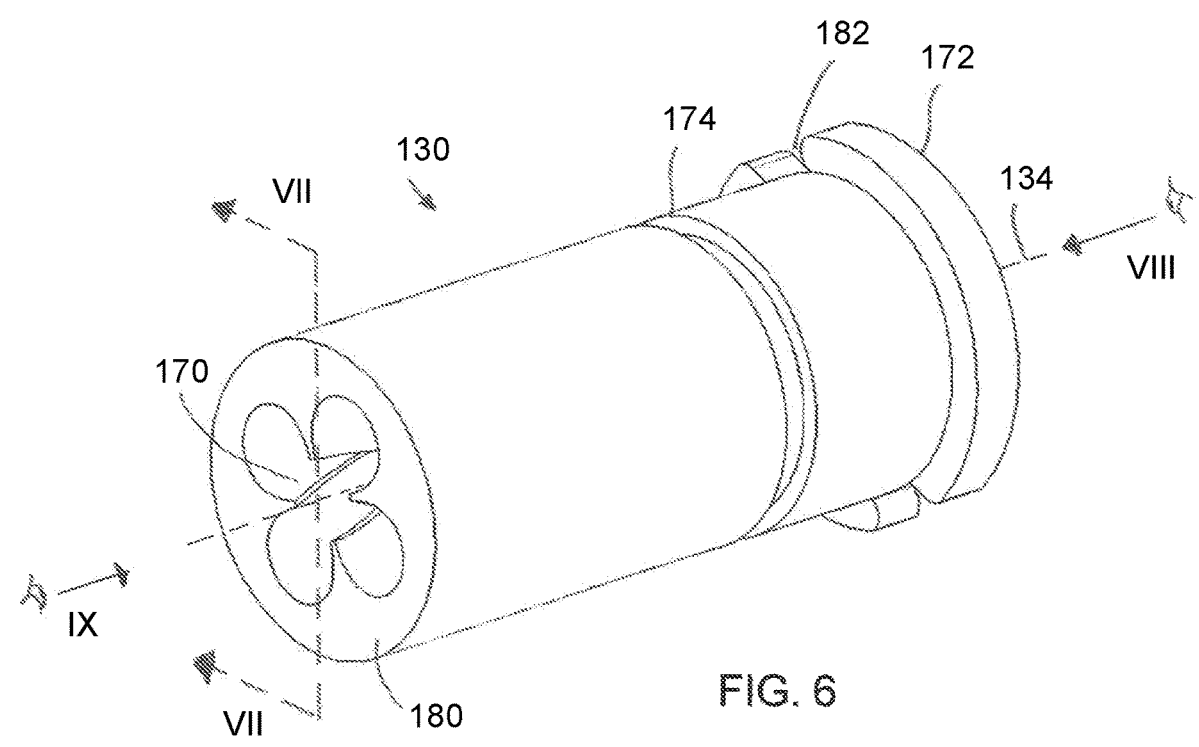
FIG. 6 is a perspective view of the nozzle tip from the nozzle assembly of FIG. 2.

FIGS. 2 through 9 show a nozzle assembly 125 in accordance with a first embodiment, and which may be the nozzle assemblies 25 shown in FIG. 1. The nozzle assembly 125 has a nozzle tip 130 journaled to a body 132 so that the nozzle tip 130 can rotate around a rotation axis 134 (FIG. 6). The body 132 is configured to be attached to a plumbing component of the liquid distribution assembly, which may be fixed to the spray boom 20. The plumbing component is operable to supply liquid from the storage tank 18 (FIG. 1) to the nozzle assembly 125.

A widened portion 136 of the body 132 has an annular outer wall which defines a circular aperture 138 for receiving the plumbing component. The profile of the aperture 138 may include a pair of diametrically opposed, axially extending, dovetail-shaped slots or cut-outs 140 for receiving corresponding tabs on the plumbing component. Each slot 140 is continuous with respective circumferentially extending guides 142 so that the body 132 can be rotated to retain the tabs of the plumbing component and lock the nozzle assembly 125 to the plumbing component in a releasable manner. Alternative quick-release mechanisms and designs may offer the same functionality.

A tapered portion 146 of the body 132 is downstream of the widened portion 136 and has an annular outer wall which defines a circular aperture 148, which may be continuous with the aperture 138 of the widened portion 136. A sub-stantially cylindrical opening or passage 149 extends longitudinally through the body 132 from a first end 150 at aperture the 138 to a second end 152. The diameter of the eternal profile of the outer walls of the tapered portion 146 narrows (tapers inwardly) towards the second end 152.

The nozzle tip 130 is journaled inside the aperture 148. The opening 149 has a first annular shelf 154, which faces the first end 150 and marks a boundary between a first portion 149a of the opening 149 adjacent end 152 and a second portion 149b of the opening 149 having a diameter that is greater than the diameter of the first portion 149a. A bearing 156 having an outer dimension that is substantially equal to the diameter of the second portion 149b abuts the first annular shelf 154. The bearing 156 may be a ball bearing, a roller bearing, or a plain bearing or bushing. The conformity between the outer dimensions of the bearing 156 and the diameter of the second portion 149b of the opening 149 prevents longitudinal movement of the bearing 156 with respect to the body 132. The bearing 156 can be press-fit in the body 132.

The opening 149 has a second annular shelf 164, which faces the first end 150 and marks a boundary between the second portion 149b of opening 149 and a third portion 149c of opening 149 having a diameter that is greater than that of the second portion 149b. An annular seal 166 having an outer dimension that is substantially equal to the diameter of the third portion 149c abuts the second annular shelf 164, fitting snuggly inside the third portion 149c. The seal 166 may have an inner diameter that is smaller than the second annular shelf 164. The seal 166 is held in place when the body 132 is attached to the plumbing component.

With particular reference to FIGS. 6 through 9, the nozzle tip 130 has a substantially cylindrical body that defines a rotation axis 134 and along which a passage 170 is aligned. The nozzle tip 130 nests inside the bearing 156 to provided supported rotation of the nozzle tip 130 with respect to body 132. The nozzle tip 130 has a shoulder 172 with a greater diameter than the inside diameter of the bearing 156. The shoulder 172 abuts the bearing 156 and prevents the nozzle tip 130 from dropping through the bearing 156.

The nozzle tip 130 has a circumferential groove 174 configured to receive a retaining clip or E-ring 176 (FIG. 5). The clip 176 and the shoulder 172 may together limit or prevent axial or longitudinal displacement of the nozzle tip 130 with respect to the bearing 156. The nozzle tip 130 is therefore journaled to the body 132 by the bearing 156 and retained axially in position by the shoulder 172 and clip 176.

The passage 170 extends axially through the nozzle tip 130 to a nozzle discharge opening 178 formed in an end face 180 thereof. The passage 170 has a rifled, or "spiral," internal profile, which rifling may extend along the full length of the passage 170, up to the end face 180. However, it should be understood that in alternative embodiments, the rifled profile may extend along only part of the passage 170. In operation, pressurized fluid flows through the passage 170 and imparts a rotational force on the nozzle tip 130, causing the nozzle tip 130 to rotate with respect to the body 132.

Figure 7:
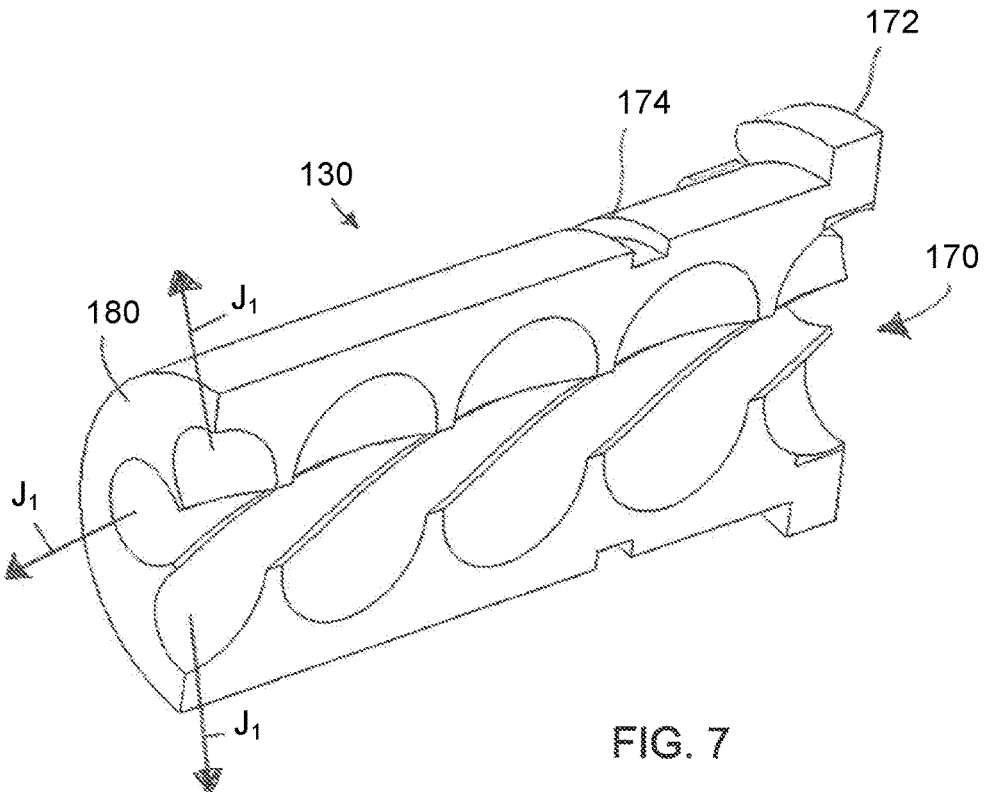
FIG. 7 is a sectional view of the nozzle tip of FIG. 6 viewed along the line VII-VII.

Due to the rifled internal profile of the passage 170 leading up to the end face 180, the liquid is discharged with off-center, or radially offset jets $J_1$ (FIG. 7). The jets $J_1$ deliver a wider spray angle and increased torque on the nozzle tip 130 as compared to spray from conventional nozzles.

Figures 2, 3, 4:
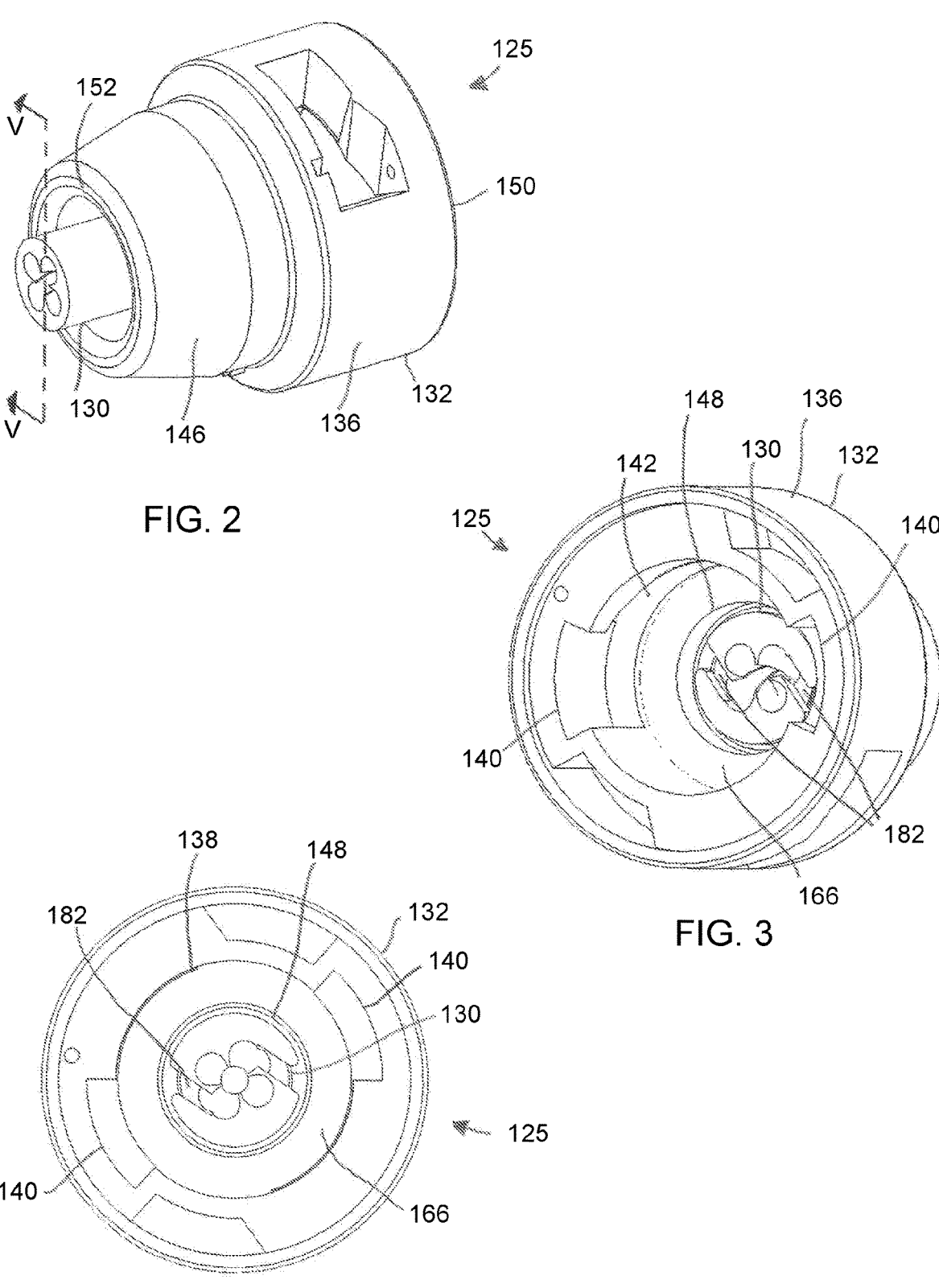
FIG. 2 is a perspective view of a nozzle assembly that may be used in the agricultural crop sprayer of FIG. 1.
FIG. 3 is another perspective view of the nozzle assembly of FIG. 2.
FIG. 4 is an end view, looking downstream into the nozzle assembly of FIG. 2.
Figure 8:
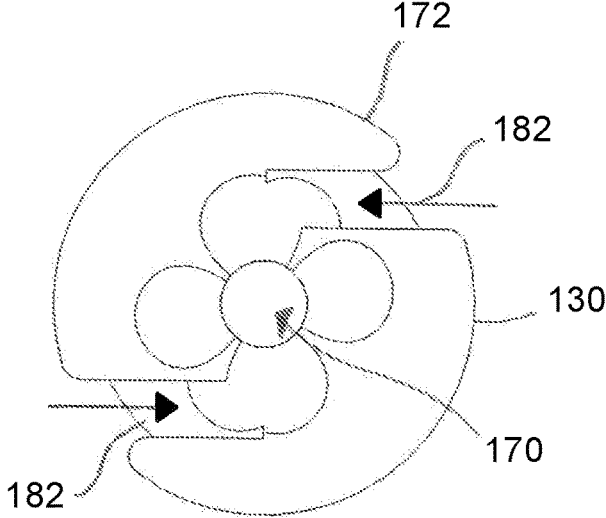
FIG. 8 is an end-on view of the nozzle tip of FIG. 6 viewed from the direction VIII.
Figure 9:
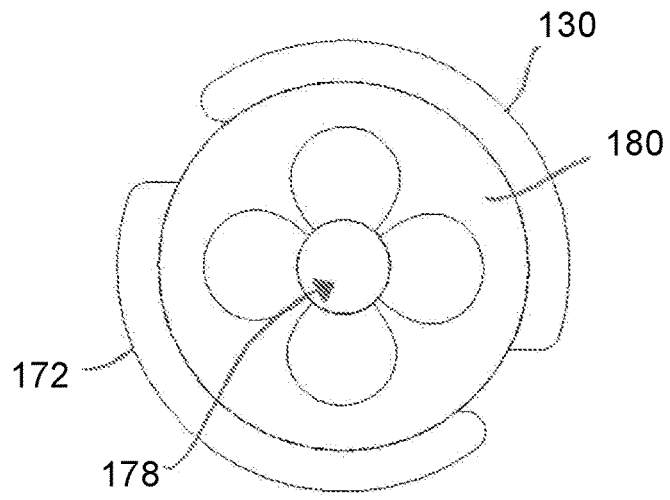
FIG. 9 is an end-on view of the nozzle tip of FIG. 6 viewed from the direction IX.

With reference to FIGS. 3, 4, and 8, radially offset channels 182 may extend through (i.e., in the plane of) the shoulder 172, outward from the passage 170. The channels 182, if present, serve as inlets or "drains," and may keep fluid and sediment from building up around the lip of the nozzle tip 130 when not in operation. Moreover, the offset radial flow of liquid imparts a further rotational force on the nozzle tip 130.

Figure 10:
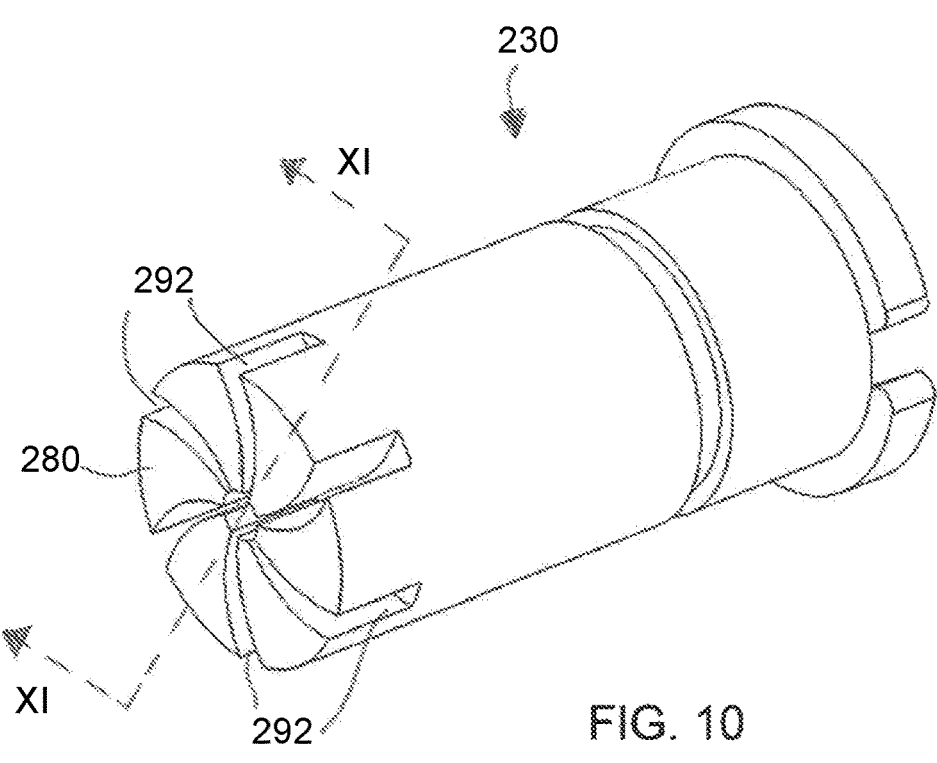
FIG. 10 is a perspective view of another nozzle tip.
Figure 11:
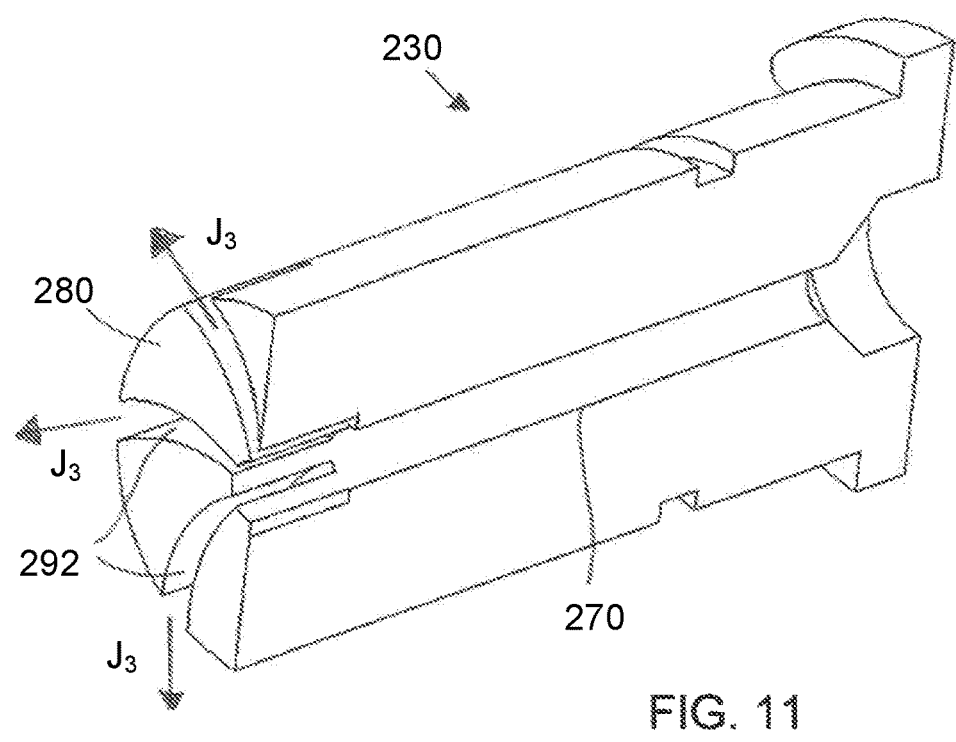
FIG. 11 is a sectional view of the nozzle tip of FIG. 10 viewed along the line XI-XI.
Figure 12:
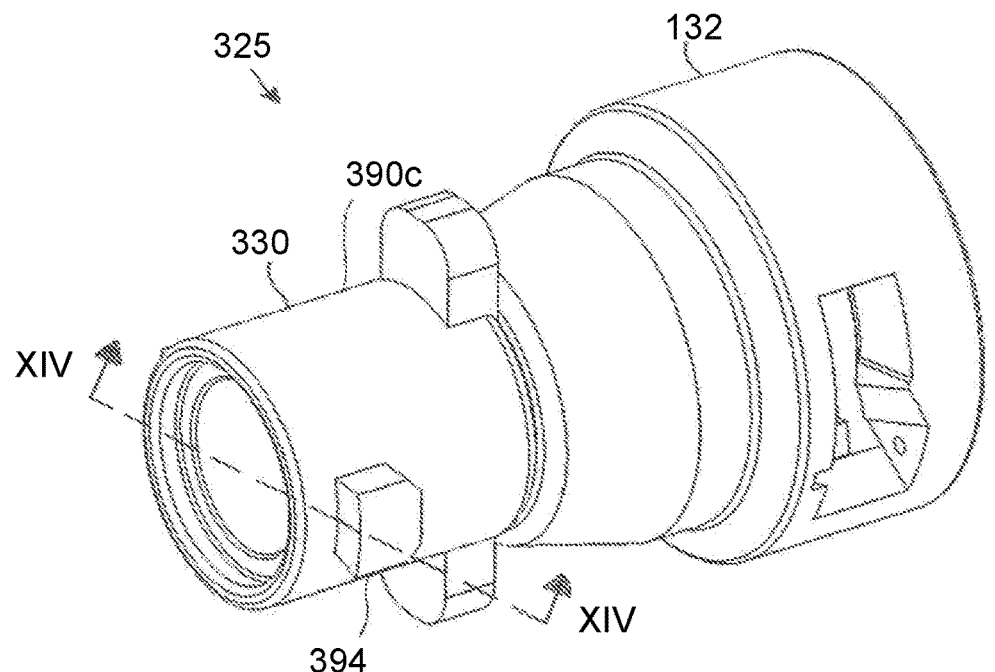
FIG. 12 is a perspective view of another nozzle assembly.
Figure 13:
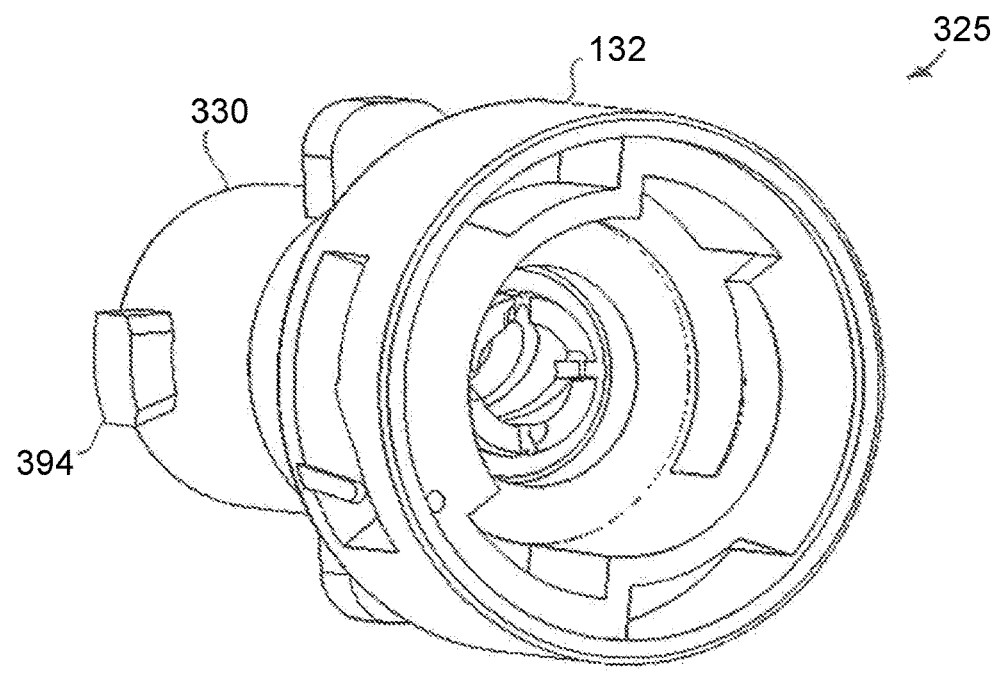
FIG. 13 is a perspective view of the nozzle assembly of FIG. 12 from another angle.

FIGS. 10 and 11 show another nozzle tip 230 including a fluid-conveying passage 270 having a surface profile that is configured to interact with fluid passing through the passage 270 to create a torque upon the nozzle tip 230. In this example, an end face 280 of the nozzle tip 230 has a surface profile that defines a plurality of radially offset vanes 292 extending outwardly from a nozzle opening 278. The radially offset vanes 292 are curved away from a radial line in the outward direction to discharge respective jets $J_3$, which impart a rotational force on the nozzle tip 230. The vanes 292 may have a depth with respect to the end face 280 of around 5 mm to 10 mm.

Although shown as having a cylindrical internal profile, the passage 270 can instead be rifled to deliver further rotational force on the nozzle tip 230. Furthermore, the radially offset vanes 292 can also be implemented in the end face 180 of nozzle tip 130 (FIGS. 5 through 9).

In the above-described embodiments, the nozzle tips 130, 230 operate as turbine elements to generate a rotational force while also delivering a spray output through a respective nozzle opening. However, in the embodiment described below, a separate nozzle tip is attached to a turbine element, the latter being journaled to a body and having a rifled internal profile.

Figure 14:
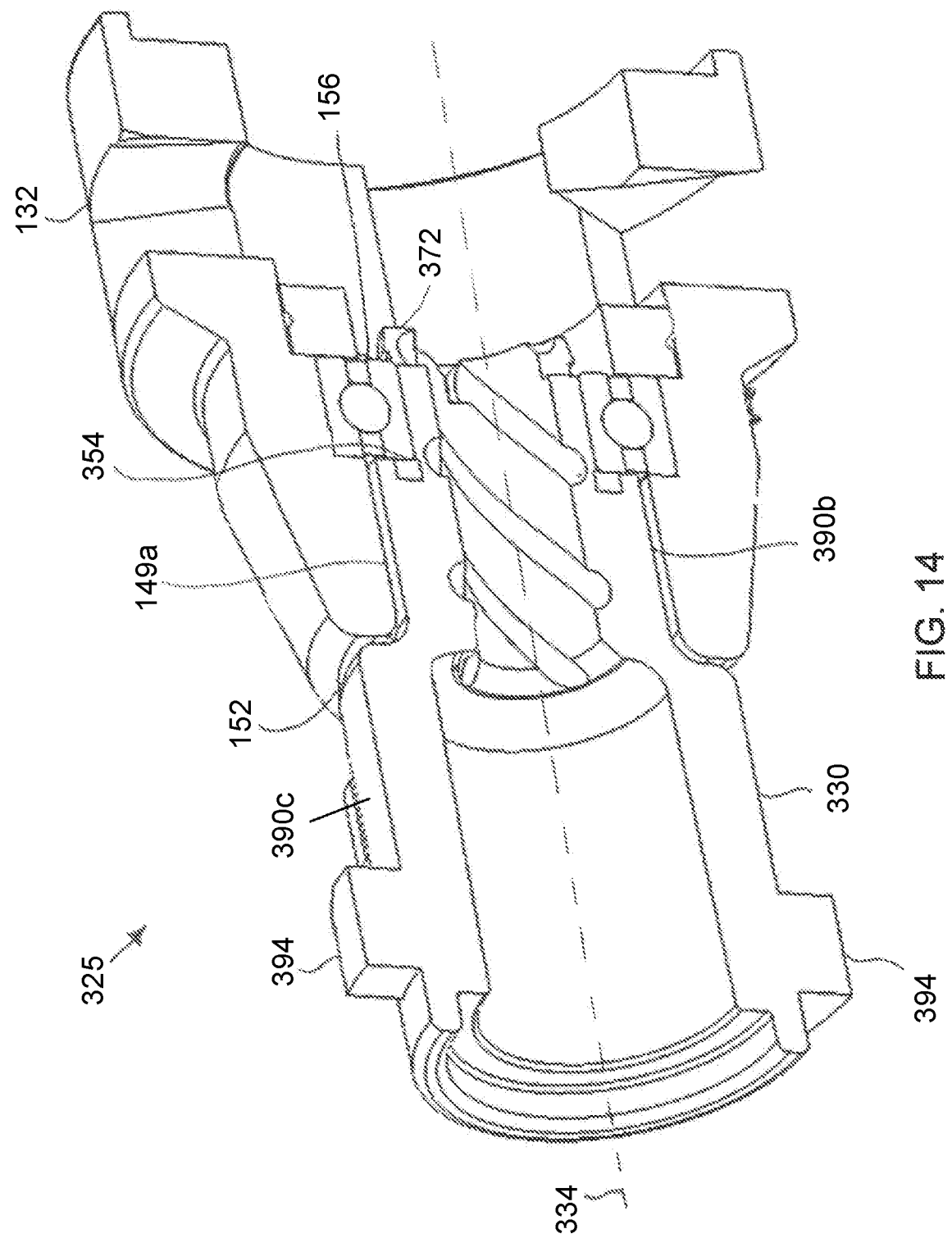
FIG. 14 is a sectional view of the nozzle assembly of FIG. 12 viewed along the line XIV-XIV.
Figure 15:
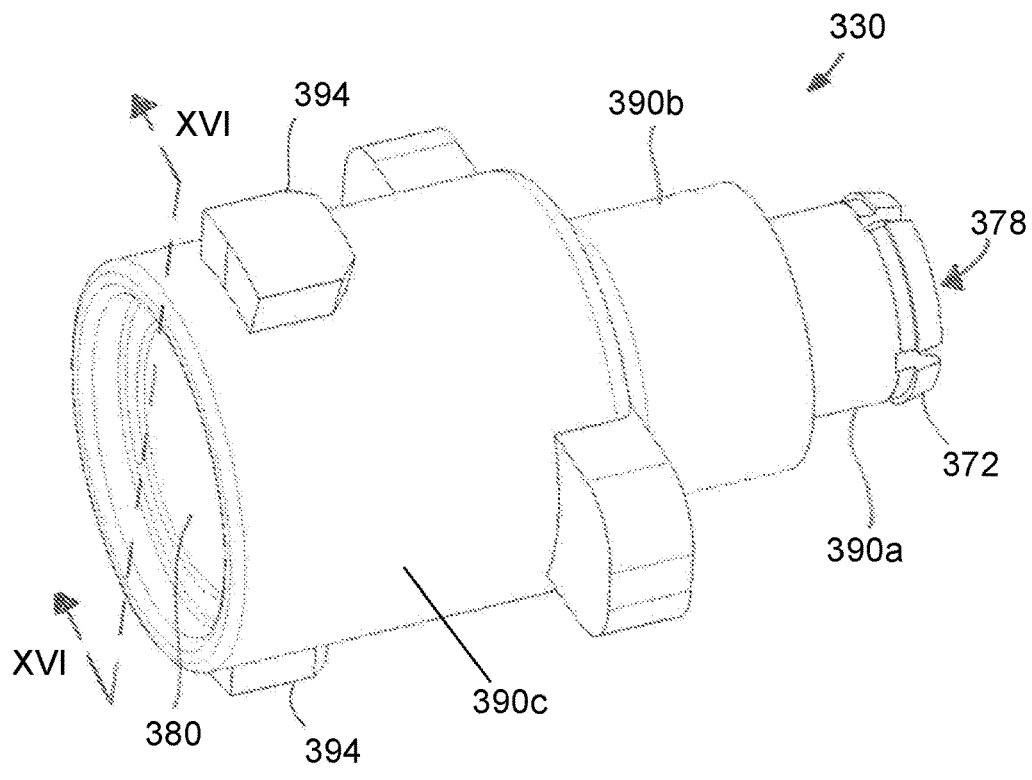
FIG. 15 is a perspective view of the nozzle tip from the nozzle assembly of FIG. 12.
Figure 16:
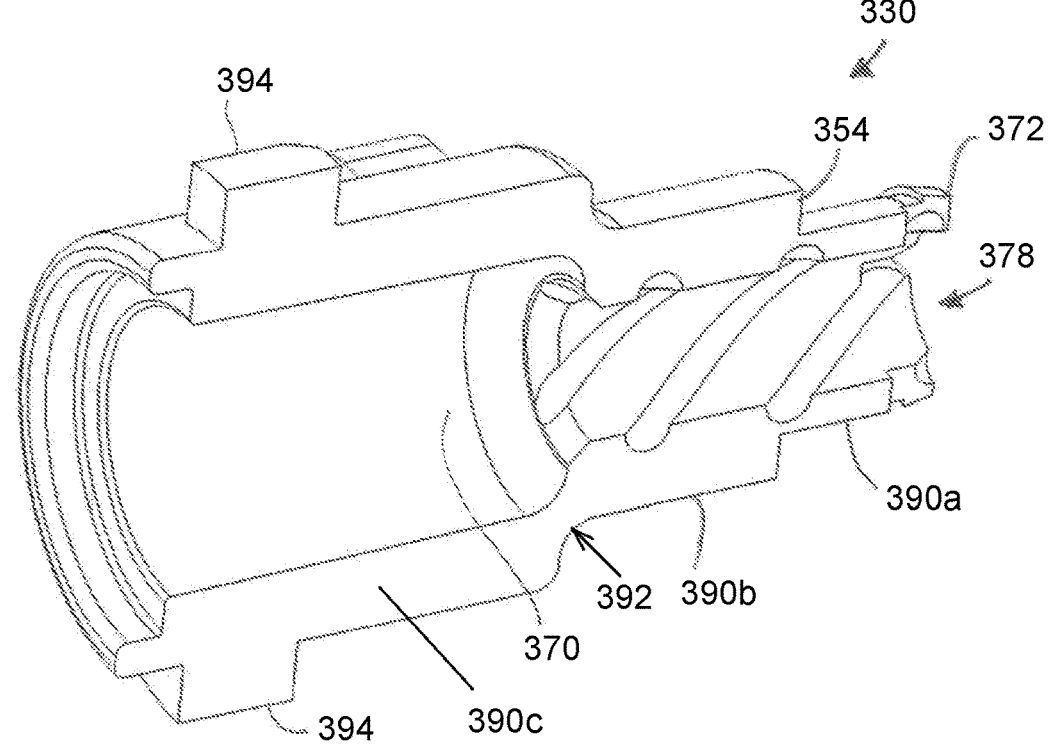
FIG. 16 is a sectional view of the nozzle tip of FIG. 15 viewed along the line XVI-XVI.

FIGS. 12 through 16 illustrate another nozzle assembly 325 that includes a turbine element 330 journaled to a body 132 so that the turbine element 330 can rotate around a rotation axis 334 (FIG. 14). The body 132 is constructed in the same way as that described above with reference to FIGS. 2 through 5 and is configured to be attached to a plumbing component of the liquid distribution assembly, which is fixed to the spray boom 20 and operable to supply liquid to be sprayed by the nozzle assembly 325.

The turbine element 330 defines a fluid passage 370 extending from an inlet 378 to an outlet 380, the passage being substantially aligned along the rotation axis 334. Both the inlet 378 and outlet 380 may have circular openings. The turbine element 330 may be formed of a material such as plastic, and may have a tubular wall that, in the illustrated embodiment, is formed of portions of different diameters.

A first tubular portion 390a is immediately adjacent the inlet 378 and is configured to be nested in an aperture of the body 132 or bearing 156, the turbine element 330 being inserted from the downstream end 152 of the body 132.

A second tubular portion 390b is located immediately adjacent the first tubular portion 390a, has a wider outer profile than the first portion 390a, and defines a first annular shelf 354 in the external profile where the two portions 390a, 390b meet. As best seen in FIG. 14, the second tubular portion 390b is sized externally to nest inside the first portion 149a of the opening 149 of the body 132 while allowing unrestricted rotation of the turbine element 330. When the first portion 390a is inserted into the bearing 156, the first annular shelf 354 abuts the bearing 156. An over-sized resilient annular tab 372 engages the inside edge of the bearing 156 when the turbine element 330 is inserted "fully home" in the bearing 156. Together, the first annular shelf 354 and annular tab 372 prevent axial movement of the turbine element 330, locking the turbine element 330 into place (but allowing for rotation).

Once inserted, the turbine element 330 can be removed from the body 132 by manipulation of the resilient tab 372 using an appropriate tool.

A third tubular portion 390c is located immediately adjacent the second tubular portion 390b and has a wider outer profile than the second portion 390b, defining a shoulder 392 where the two portions 390b, 390c meet. The third portion 390c therefore flares outwardly at an axial position that may conform with the end 152 of the body 132 to form a labyrinth seal to protect against the ingress of dirt between the turbine element 330 and the body 132 (see FIG. 14).

The tubular portions 390a, 390b, 390c may be formed together as an integral component defining the continuous fluid-conveying passage 370.

The turbine element 330 is adapted for attachment of a nozzle tip which, when attached, is in fluid communication with the passage 370. A pair of diametrically opposed dovetailed lugs 394 on the outer circumferential face of the third tubular portion 390c may be configured for keying with a nozzle tip, which may be a standard nozzle. In one embodiment, the lugs 394 provide an ISO quick-attach lug connection.

Part of the length of the passage 370 has a rifled internal profile. Best seen in FIG. 16, the internal profile of the first and second portions 390*a*, 390*b* may be of a substantially constant diameter and rifled. The internal profile of the third portion 390*c* may flare out to a wider diameter, and may not be rifled. However, the internal diameter(s) and profiling of the passage 370 may vary in alternative configurations. For example, the rifling may extend along the full length of the passage 370.

In operation, pressurized fluid flows through the passage 370 and imparts a rotational force on the turbine element 330, causing the turbine element 330 and any nozzle tip attached thereto to rotate with respect to the body 132.

The nozzle assemblies described herein include a common body design which permits either the attachment of a nozzle tip (for example nozzle tip 130) or a turbine element (for example turbine element 330) for supporting a nozzle tip. Advantageously, this provides a flexible system allowing the user to adopt either approach as desired.

The components forming the nozzle assemblies described may be formed of plastic by molding (e.g., injection molding) or printing (i.e., additive manufacturing), or any other method known in the art.

Figure 17:
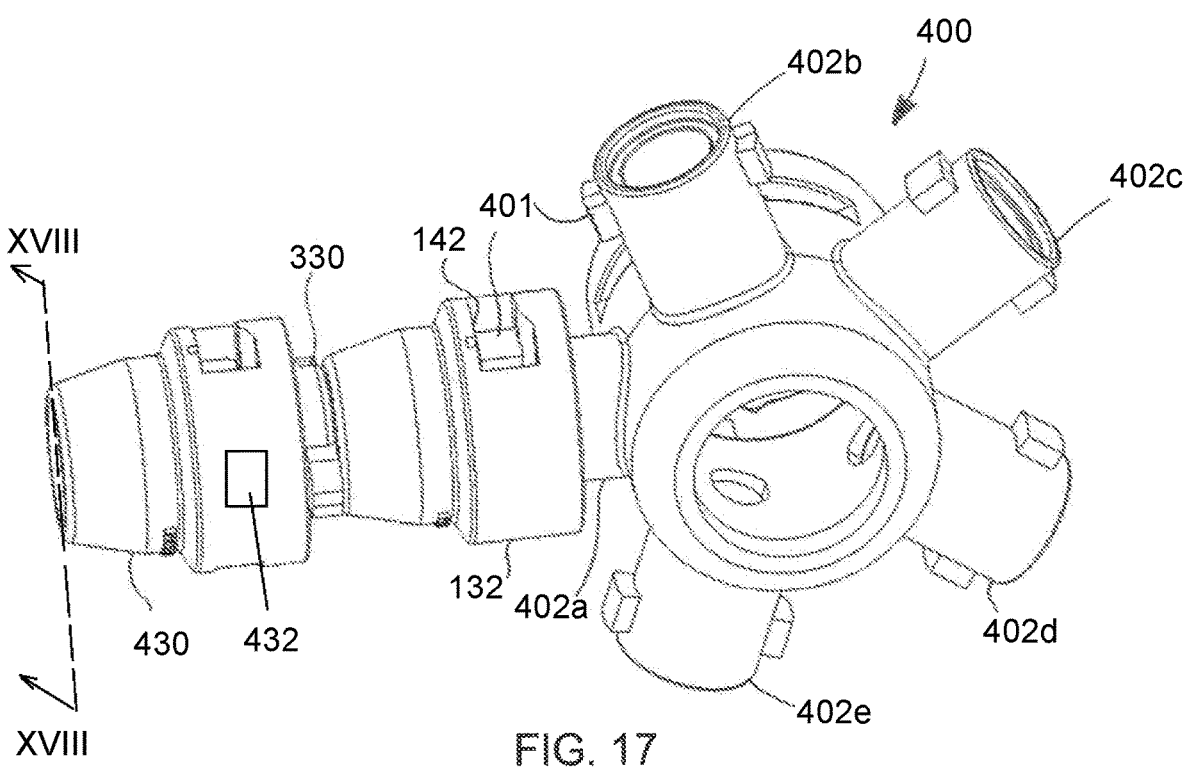
FIG. 17 is a perspective view of the nozzle assembly of FIG. 12 coupled to a multiple-nozzle body.
Figure 18:
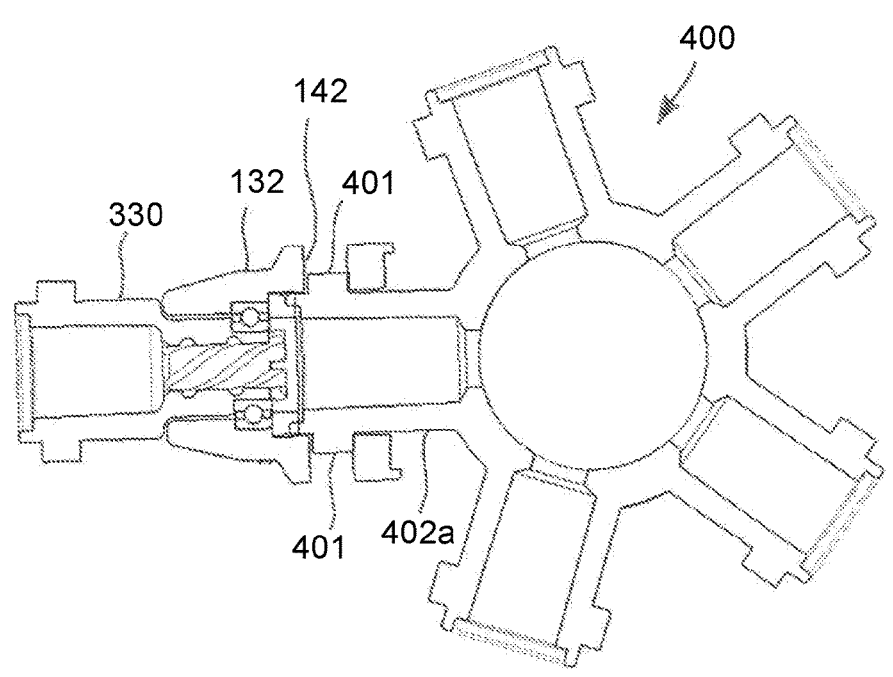
FIG. 18 is a sectional view of the multiple-nozzle body of FIG. 17 viewed along the line XVIII-XVIII.

With reference to FIGS. 17 and 18, the body 132 is shown mounted to one port of a multiple (5-port) nozzle body 400, which may form part of a liquid distribution system fixed to sprayer boom 20. Locking tabs 401 on each of the outlet ports 402*a-e* can interlock with the guides 142 in the body 132. The body 132 can therefore be simply locked onto, or unlocked from, an outlet port 401 through rotation in a known manner.

The turbine element 330 is shown in FIGS. 17 and 18 as being in locking engagement with the body 132. FIG. 17 shows a standard nozzle tip 430 in locking engagement with the turbine element 330. A user can simply attach and detach standard nozzle tips 430 to turbine element 330 as required, benefiting from the rotational motion generated by the turbine element 330.

In another embodiment, a "flag" or indicator 432 is provided on a turbine element 330 or nozzle tip 430, and a sensing device is configured to monitor the rotation speed of the nozzle. For example, the flag 432 may be a visible mark, a magnet, an RFID tag, etc. A controller in communication with the sensing device may be configured to determine a fluid flow rate from the rotation speed of the nozzle.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various sprayer types and configurations.

The invention claimed is:

1. A nozzle assembly for use with an agricultural crop sprayer, the nozzle assembly comprising:
   a nozzle body;
   a bearing secured inside the nozzle body, wherein the nozzle body and bearing together define a circular aperture; and a turbine element journaled inside the bearing, the turbine element defining a shoulder having a diameter greater than a diameter of the aperture, the turbine element defining an internal passage configured to convey a fluid, the internal passage having a rifled profile, wherein the turbine element comprises a nozzle tip having a nozzle opening formed in an end face of the nozzle tip, the nozzle opening being in fluid communication with the internal passage; wherein the turbine element defines at least one radially offset channel extending through the shoulder outward from the internal passage.

2. The nozzle assembly of claim 1, wherein the turbine element has a generally cylindrical exterior surface.

3. The nozzle assembly of claim 1, wherein the nozzle body defines a first annular shelf, and wherein the bearing abuts against the first annular shelf to prevent longitudinal movement of the bearing.

4. The nozzle assembly of claim 3, wherein the nozzle body defines a second annular shelf coaxial with the first annular shelf, and wherein the nozzle assembly further comprises an annular seal within the nozzle body and abutting the second annular shelf to retain the bearing in the nozzle body.

5. The nozzle assembly of claim 1, wherein the turbine element defines a circumferential groove, and wherein the nozzle assembly further comprises a retaining clip in the circumferential groove, the retaining clip operable to prevent longitudinal displacement of the turbine element with respect to the aperture.

6. The nozzle assembly of claim 1, wherein the rifled profile extends to the end face.

7. The nozzle assembly of claim 1, wherein the rifled profile comprises a plurality of radially directed channels extending to the end face.

8. The nozzle assembly of claim 1, wherein the turbine element is configured to rotate inside the bearing around a rotational axis thereof, the rotational axis aligned with the internal passage.

9. The nozzle assembly of claim 8, wherein the rifled profile is configured to discharge jets of the fluid off-center from the rotational axis of the turbine element.

10. A nozzle assembly for use with an agricultural crop sprayer, the nozzle assembly comprising:
    a nozzle body;
    a bearing secured inside the nozzle body and defining a circular aperture;
    a turbine element journaled inside the bearing, the turbine element defining an internal passage configured to convey a fluid, the internal passage having a rifled profile, the turbine element comprising lugs on a circumferential face; and
    a nozzle tip coupled to the turbine element, wherein the nozzle tip is in fluid communication with the internal passage;
    wherein the lugs are configured for keying with the nozzle tip.

11. The nozzle assembly of claim 10, wherein the lugs are dove-tailed.

12. The nozzle assembly of claim 10, wherein the nozzle tip defines a nozzle opening formed in an end face of the nozzle tip, wherein the nozzle opening is in fluid communication with the internal passage.

13. A nozzle assembly for use with an agricultural crop sprayer, the nozzle assembly comprising:
    a nozzle body;

a bearing secured inside the nozzle body and defining a circular aperture; and a nozzle tip journaled inside the bearing, the nozzle tip having a nozzle opening formed in an end face of the nozzle tip, the nozzle tip defining a fluid-conveying passage having a surface profile configured to interact with a fluid passing through the passage to apply a torque upon the nozzle tip, wherein the surface profile defines a plurality of radially offset vanes extending outward from the nozzle opening.

14. The nozzle assembly of claim 13, wherein the surface profile is rifled.

\* \* \* \* \*